Patented Jan. 14, 1936

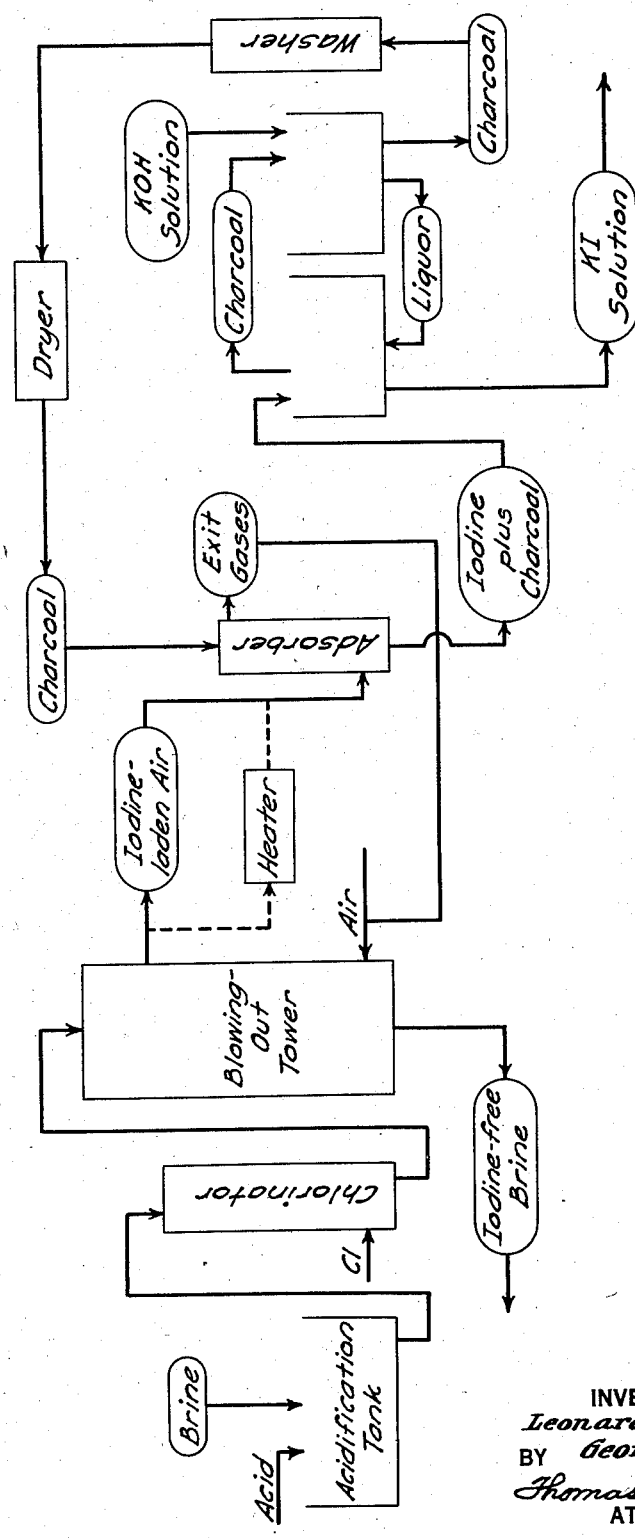

2,028,099

UNITED STATES PATENT OFFICE 2,028,099

PROCESS FOR EXTRACTING IODINE

Leonard C. Chamberlain and George W. Hooker, Midland, Mich., assignors to The Dow Chemical Company, Midland, Mich., a corporation of Michigan Application December 29, 1932, Serial No. 649,348

11 Claims. (Cl. 23—216)

The present invention relates to processes for extracting iodine from mother liquors, natural brines and the like.

In United States Patent No. 1,853,621 to Jones and Grebe, there is described a procedure for extracting iodine from a natural iodiferous brine in which the brine is first acidified, then electrolyzed or otherwise oxidized to liberate iodine, such iodine then being separated from the brine by blowing out with a current of air, after which the iodine-laden air is scrubbed with an alkaline solution to remove the iodine therefrom.

The commercial application of the foregoing process demonstrated certain limitations, particularly with respect to the recovery of the iodine from the air stream. It was found that to remove the iodine from the large volume of air accompanying it required so great a time of contact between the liquor and the iodine-laden air that an excessively large contact surface must be provided in the absorption apparatus and an excessively large volume of alkali solution must be handled. This gave rise to a burdensome power cost both for blowing the air through the absorption apparatus against the resistance of the packing and large volume of scrubbing liquor therein, and also for pumping the liquor. Another disadvantage was the necessity of employing a very dilute alkali solution for the absorption, in practice an approximately 1.5 per cent $K_2CO_3$ solution. There was a loss of part of the alkali in the solution by conversion to bicarbonate through the action of $CO_2$ in the air current, the bicarbonate being largely ineffective to absorb iodine from the air. Even under best conditions the absorption of iodine in the alkali solution fell considerably short of being complete, in practice a loss of as much as 20 per cent being sustained, and the strength of the resultant iodide solution was only about 1.7 per cent. To produce solid crystals of the iodide from such a dilute liquor required an excessive amount of evaporation and purification of the crystals from excess alkali and accompanying salts was necessary.

In United States Patent No. 1,897,031, a method is described which avoids some of the aforementioned difficulties, in that the iodine is removed from the iodine-laden air by adsorption upon active charcoal, and the iodine recovered from the charcoal by distilling out with steam. By such procedure the iodine is recovered largely in the elemental state but accompanied by more or less hydriodic acid produced by reaction of steam with the iodine. The iodine so produced must be purified to separate it from the hydriodic acid, or the mixture of the two may be converted to an iodide by the known methods of chemical treatment. We have found it more advantageous, however, to extract the iodine-saturated charcoal directly with a hot alkali solution, for which purpose a strong solution may be employed, thus yielding at once a concentrated iodide solution suitable for crystallizing with little further evaporation. Extraction with the hot alkali solution also practically prevents the formation of iodates, due to the reducing effect of the charcoal.

It is accordingly among the objects of our invention to provide a process for recovering iodine from natural brines and the like, whereby the iodide product is prepared directly in a purer form and at greatly reduced cost for evaporation than in the known process in which iodine is removed from an iodine-laden air current by scrubbing with an alkaline solution. The invention, then, consists of the combination of steps hereinafter fully described and pointed out in the claims, the accompanying drawing illustrating one preferred mode of procedure.

In the drawing, the single figure is a diagrammatic arrangement on the order of a flow sheet, setting out the sequence of steps and movement of materials in the process.

The natural brine supplies available as a source of iodine contain the latter in combined form as iodide, which is present in exceedingly small amount, e. g. from about 40 to 60 parts per million, accompanied by much larger amounts of other salts, principally chlorides. Such brines are often derived from oil fields, and may be contaminated more or less by oily or other form of organic matter. In many cases the brine should be clarified and filtered prior to processing, so as to remove suspended matter and organic impurities.

Reference to the drawing will assist in a ready understanding of the process description which follows. The raw brine, which has first been clarified, if necessary, is then acidified with a strong mineral acid, e. g. $H_2SO_4$ or $HCl$. The degree of acidification should correspond to a pH value not higher than about 3. The acidified brine is treated with a suitable oxidizing agent to liberate iodine in the elemental state. Chlorine is usually preferred for the purpose, inasmuch as its cost is low and it is easily introduced and mixed with the brine to liberate iodine therein. Care should be taken not to add a material excess of chlorine over the theoretical equivalent of the iodine to be liberated, so as to avoid over-oxidizing a portion of the liberated iodine to form iodic acid, which is soluble in water and cannot be recovered in the subsequent steps of the process. An advantageous procedure consists in adding about the theoretically required amount of chlorine and then a slight excess of a weaker oxidizing agent, such as nitrous acid. The excess of weak oxidizing agent insures complete liberation of the iodine, while the strength of the agent is insufficient to over-oxidize any of the liberated iodine.

The acidified and oxidized brine, containing the free iodine, is then intimately contacted with a current of air which vaporizes, or blows out, the iodine and separates it from the aqueous solution, the iodine vapors being carried away in the air stream. The blowing-out operation is conveniently carried out in tall towers in which the iodine-containing brine is introduced at the top and is sprayed, or distributed over a body of packing material, thus falling or flowing against an upward current of air introduced at the bottom of the tower. Substantially all of the iodine liberated in a brine containing about 40 parts per million thereof can be blown out at ordinary temperatures. The de-iodinated brine passing from the blowing-out tower may be run to waste, or otherwise disposed of, the total iodine content thereof normally having been reduced to not more than 1 to 5 parts per million.

The iodine-laden air stream is then passed through an adsorption apparatus or adsorber, wherein the air is brought into contact with a body or bed of activated carbon or charcoal, upon which the iodine is adsorbed and thereby removed from the air. Such apparatus may consist of a single unit, or a plurality of units, designed to hold a body of the charcoal and permit the air stream to be brought in intimate contact with the charcoal. Activated coconut charcoal of about 6 to 20 mesh size has been found well adapted to the purpose, such material being capable of adsorbing nearly its own weight of iodine, if dry. For good efficiency condensation of moisture from the air upon the charcoal should be avoided, since, if the latter becomes wet, it largely loses its power to adsorb iodine. Hence it is important to maintain the temperature of the iodine-laden air above its dew point while in contact with the charcoal. When operating under warm weather conditions, no special treatment may be necessary, but, especially in colder weather, it will, as a rule, be necessary to heat the air in order to hold it above the dew point until it has passed through the charcoal adsorber. This may be conveniently done by by-passing a portion of the air stream, passing it through a heater, and then intermixing the heated air with the remainder of the air stream. The proportion of air by-passed, and the temperature to which it is heated is regulated, so that the temperature of the whole body of air after mixing with the heated portion will be safely above the dew point.

It is feasible to adsorb substantially all of the iodine from the air stream, for example 95 per cent or more thereof, but in order to conserve small amounts which may escape, the exit gases from the adsorber may be returned to the blowing-out tower and used over again for blowing out the iodine from a further quantity of the oxidized brine.

When the charcoal in the adsorber is nearly saturated with iodine, it is removed and replaced by a fresh charge. For continuous operation, one way in which this can be readily accomplished is by providing two adsorbers in parallel, one of which may be in use while the other is shut off for unloading and recharging. The iodine-saturated charcoal is conveyed to an extraction apparatus, wherein it is treated with a hot alkali solution, such as a hydroxide or carbonate of sodium or potassium. The extractor may consist of a tank provided with steam coils into which a charge of iodine-saturated charcoal is placed and covered by the alkali solution, the mixture being heated to about boiling temperature with the steam coils. The alkali solution dissolves the iodine out of the charcoal. The usual equation for the reaction of iodine and an alkali is;

$$3I_2 + 6KOH \rightarrow 5KI + KIO_3 + 3H_2O$$

In the present process, however, at the boiling temperature the charcoal acts as a reducing agent to prevent the formation of iodate for the most part, so that in practice the resulting solution contains principally iodide while the iodate content, if any, does not exceed 1 to 2 per cent of the total iodine.

By carrying out the extraction in two stages an iodide solution may be obtained which is essentially free from excess alkali. In the first stage the iodine-saturated charcoal is treated with an alkaline solution from a previous treatment, containing both alkali and iodide, the amount of the solution being proportioned so that the alkali content is insufficient to react with all of the iodine in the charcoal. By this treatment a portion of the iodine is extracted from the charcoal, and the alkali in the solution is substantially all reacted. The solution is drained from the charcoal, and the latter is washed, preferably with an iodide solution resulting from a subsequent washing step. The charcoal is then treated in the second stage with a fresh alkali solution in excess of the iodine remaining therein, so that substantially all of the remaining iodine is extracted. The charcoal is separated from the solution, and the latter is advanced to the first stage for treating another charge of saturated charcoal. By such counterflow method of treatment, in two or more stages, the iodine is most efficiently recovered from the charcoal and the iodide solution may be obtained substantially free from excess alkali.

A strong alkali metal iodide solution is prepared in the above-described extraction step. For example, the iodine-saturated charcoal is extracted with a 10 per cent KOH solution by boiling until the volume of the solution is reduced by about one-half. The solution drained from the charcoal in the first stage of the counterflow extraction and combined with the first wash water may contain 25 to 30 per cent of potassium iodide. This strong solution, after filtering if necessary, may be evaporated to crystallize the iodide directly. In similar manner sodium iodide may also be produced, using sodium hydroxide solution for extracting the iodine from the charcoal.

The extracted charcoal, after draining from the solution, is washed a number of times to remove mineral salts as far as possible. It is advantageous to conduct the washing in countercurrent manner in a number of stages, similarly as in the extraction step. The fresh water is first contacted with the nearly salt-free charcoal from the previous washing stages, while the freshly drained charcoal from the extraction step is washed with the water which has been used successively in each of the following washing stages. The final wash water may be used for washing in the extraction step, as already described. After washing, the charcoal is dried and returned to the adsorber for use in adsorbing a further quantity of iodine. Treated in this way the charcoal may be used repeatedly for a large number of extractions. It is advantageous, however, to reactivate the charcoal at intervals of several months, as by heating the same with steam to a high temperature, according to the known method employed in making the material originally.

By proceeding in the manner hereinbefore described, iodine may be recovered from natural brines and converted to an alkali metal iodide in continuous process, while avoiding the disadvantages attendant upon the practice of the previously known method of scrubbing the iodine-laden air directly with a weak alkali liquor. The percentage recovery of iodine is materially increased, the power cost of handling and circulating a large volume of air and weak alkali liquor and the cost of evaporating the very dilute iodide solution are saved, and a smaller, more compact and less costly plant may be used.

Although we have described our invention as employing air in the blowing-out step, we may use instead thereof any gas or gas mixture substantially inert to iodine, for example nitrogen, carbon dioxide, combustion gases, etc. Likewise, the process is not limited to use with natural brines, but is applicable to any water solution of an iodide in which the iodine may be liberated and recovered in the manner hereinbefore described. In the extraction step, naturally, the treatment of the iodine saturated charcoal may be made in situ, if desired, without removing the charcoal from its container.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. The process of producing an iodide from natural iodiferous brines and the like which comprises liberating the iodine in the brine, blowing the iodine out with a current of air, adsorbing the iodine from the air current by contacting the latter with a body of active carbon, while maintaining the temperature of said current above the dew point thereof, and extracting the iodine from the carbon by treating with a hot solution of an alkali.

2. The process of producing an iodide from natural iodiferous brines and the like which comprises liberating the iodine in the brine, vaporizing the iodine by blowing out with a current of air, heating the iodine-laden air current above the dew point thereof, passing the same in contact with a body of active carbon to adsorb the iodine thereon, and extracting the iodine from the carbon by treating with a hot solution of an alkali.

3. The process of producing an iodide from natural iodiferous brines and the like which comprises liberating the iodine in the brine, vaporizing the iodine by blowing out with a current of air, removing the iodine from the air current by passing the same in contact with a body of active carbon, while maintaining the temperature of said current above the dew point thereof, and treating the iodine-saturated carbon with a boiling solution of an alkali metal hydroxide.

4. The process of producing an iodide from natural iodiferous brines and the like which comprises liberating the iodine in the brine, vaporizing the iodine by blowing out with a current of air, heating the iodine-laden air to a temperature above the dew point thereof, contacting the same with a body of active carbon to remove the iodine by adsorption on the carbon, treating the iodine-saturated carbon with a boiling solution of an alkali metal hydroxide, separating the extracted carbon from the resulting alkali metal iodide solution and crystallizing such iodide from the latter.

5. The process of producing an iodide from natural iodiferous brines and the like which comprises liberating the iodine in the brine, vaporizing the iodine by blowing out with a current of air, heating the iodine-laden air to a temperature above the dew point thereof, contacting the same with a body of active carbon to remove the iodine by adsorption on the carbon, extracting the iodine-saturated carbon with a boiling solution of an alkali metal hydroxide in countercurrent manner in a plurality of stages, separating the resulting alkali metal iodide solution from the carbon, washing and drying the latter and returning the same to the extraction step.

6. In a method of producing an iodide, the steps which consist in contacting a current of iodine-laden air with a body of active carbon to adsorb iodine thereon, while maintaining the temperature of said air current above the dew point thereof, and then extracting such adsorbed iodine by treating the carbon with a hot solution of an alkali.

7. In a method of producing an iodide, the steps which consist in contacting a current of iodine-laden air with a body of active carbon to adsorb iodine thereon, while maintaining the temperature of said air current above the dew point thereof, and then extracting such adsorbed iodine by treating the carbon with a boiling solution of an alkali metal hydroxide.

8. The process of producing an iodide from natural iodiferous brines and the like which comprises liberating the iodine in the brine, vaporizing the liberated iodine by blowing out with a current of air, heating the iodine-laden air current above the dew point thereof, passing the same in contact with a body of active carbon to adsorb the iodine thereon, and extracting the iodine from the carbon with a boiling solution of an alkali metal hydroxide.

9. The process of producing an iodide from natural iodiferous brines and the like which comprises liberating the iodine in the brine, vaporizing the liberated iodine by blowing out with a current of air, heating the iodine-laden air current above the dew point thereof, passing the same in contact with a body of active carbon to adsorb the iodine thereon, and extracting the iodine from the carbon with a boiling solution of an alkali metal carbonate.

10. The process of extracting iodine and compounds thereof from natural brines and the like which comprises liberating elemental iodine in the brine, blowing the liberated iodine out with a current of air, adsorbing the iodine from the iodine-laden air current by contacting the latter with a body of active carbon, while maintaining the temperature of said current above the dew point thereof, and extracting the iodine from the carbon by treating with a boiling solution of an alkali in countercurrent in a plurality of stages.

11. The process of extracting iodine and compounds thereof from natural brines and the like which comprises liberating elemental iodine in the brine, blowing the liberated iodine out with a current of air, heating the iodine-laden air current above the dew point thereof, adsorbing the iodine from said current by contacting the latter with a body of active carbon, and extracting the iodine from the carbon by treating with a boiling solution of an alkali in countercurrent manner in a plurality of stages.

LEONARD C. CHAMBERLAIN.
GEORGE W. HOOKER.